Aug. 11, 1953 A. BECHLER 2,648,239
GUARD CONSTRUCTION FOR MACHINE TOOLS
Filed Dec. 17, 1948 2 Sheets-Sheet 1
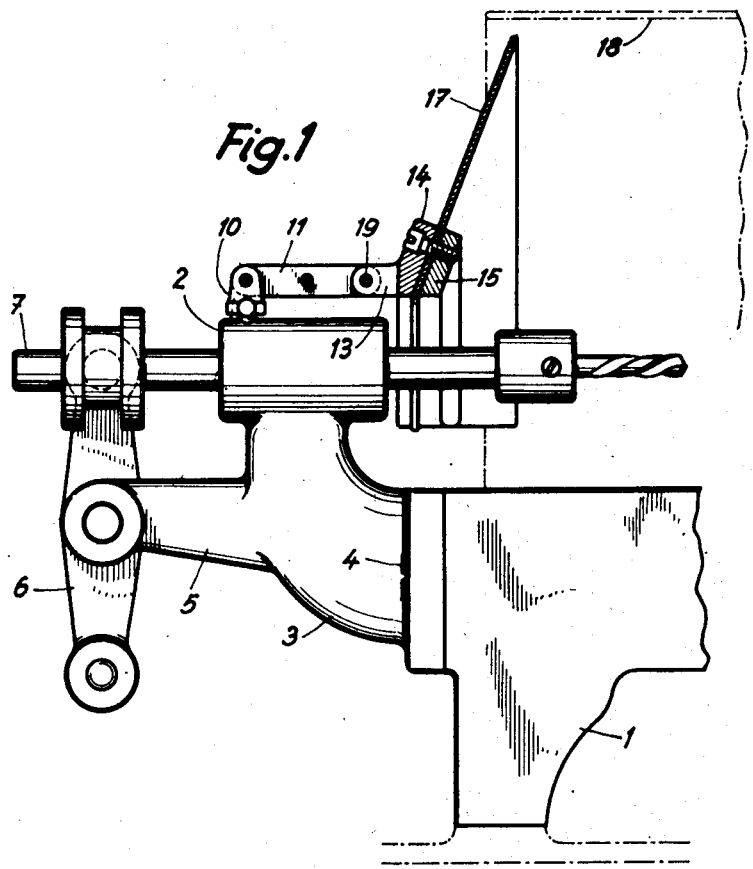
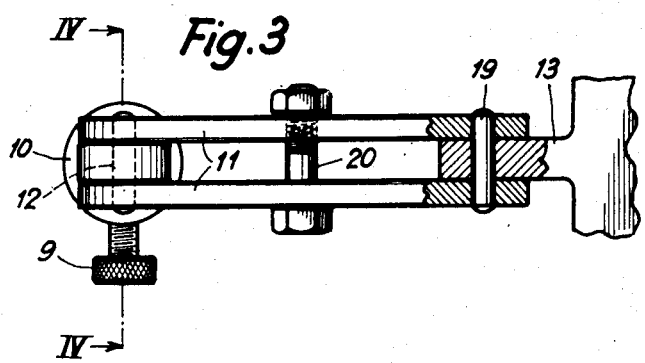
INVENTOR:
ANDRÉ BECHLER
BY K. A. Mayr
ATTORNEY.

Aug. 11, 1953 A. BECHLER 2,648,239
GUARD CONSTRUCTION FOR MACHINE TOOLS
Filed Dec. 17, 1948 2 Sheets-Sheet 2

INVENTOR:
ANDRÉ BECHLER

Patented Aug. 11, 1953

2,648,239

UNITED STATES PATENT OFFICE 2,648,239

GUARD CONSTRUCTION FOR MACHINE TOOLS

André Bechler, Moutier, Switzerland

Application December 17, 1948, Serial No. 65,911
In Switzerland December 24, 1947

2 Claims. (Cl. 77—55)

Automatic machine tools usually operate at such a great speed that the cuttings and the tool lubricating oil are thrown out by centrifugal action and endanger the operator of the machine. Proposals have been made to provide a protecting cover the edges of which overlap the tray of the machine, to conduct the oil drops and cuttings into the tray. With such covers there is a rather large aperture at each end of the cover.

The primary object of the present invention is to provide as an accessory for a machine tool, which is equipped with a protecting hood or cover, a guard shield vertically swingable about an axis perpendicular to a vertical plane including the horizontal rotation axis of the tool.

Another object of the invention is to make the guard shield of transparent material.

A further object of the invention is to removably support the shield on a vertical pivot provided wherever a guard is desired.

Other objects of this invention will appear hereinafter as the description of the invention proceeds, the novel features, combinations and construction being more particularly pointed out in the specification and the claims hereunto appended.

The accompanying drawing represents, by way of example, an embodiment of the accessory according to the invention.

Fig. 1 is a part sectional side elevation of the accessory;

Fig. 3 is a plan view of a detail on a larger scale and with a portion in section.

Figure 2:
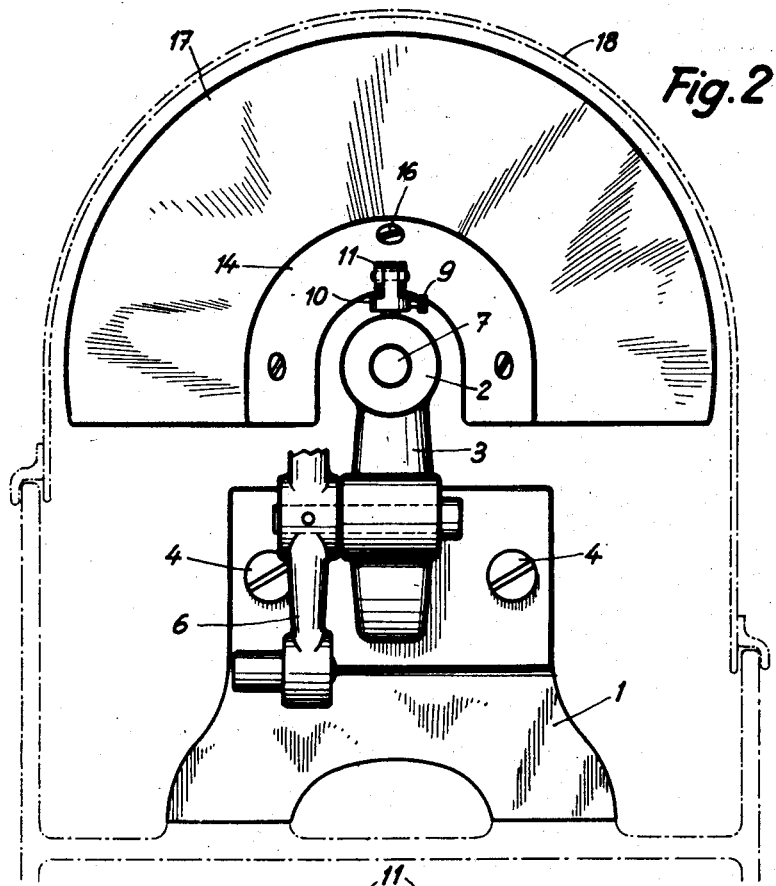
Fig. 2 is an end elevation.

Numeral 1 designates a portion of the bed of the machine to which the accessory is fixed. The drilling tool shown comprises a bearing post 2 made integral with a bracket 3 fixed to the bed 1 by means of screws 4. The bracket 3 has an extension or arm 5 on which a lever 6 is rotatably mounted; lever 6 serves to axially shift a shaft 7 of a drill in the conventional manner.

Figure 4:
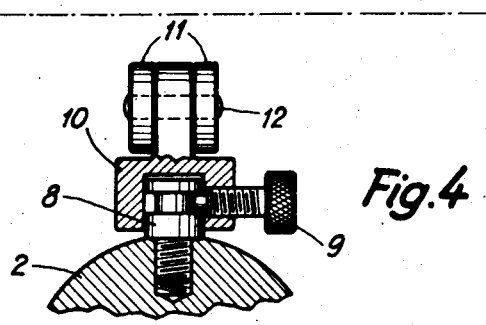
Fig. 4 is a partial sectional view along the line IV—IV of Fig. 3.

A pivot 8 screwed by its lower threaded portion to the upper part of the bearing post 2 (see Fig. 4) has a circular groove which is engaged by a set screw 9 screwed through the base of a support 10. A horizontal pin 12 projects from both sides of a vertical flat portion of support 10, a link member 11 being swingable on each end of pin 12. Members 11 straddle and are swingably connected by a pin 19 with an arm 13 extending from a flange 14 having the shape of an inverted U and forming a bracket to which a screen 17 made of transparent material is fixed by means of an anchor plate 15 and screws 16. The parts 14, 15 and 17 are inclined relatively to the arm 13. The shield 17, the periphery of which is conformed to that of a protecting cover or hood 18 represented in dot-and-dash lines in Figs. 1 and 2, has a substantially semi-circular frusto-conical configuration and will deflect in a predetermined direction, cuttings which are thrown on it when the machine tool is in operation.

A screw and nut assembly 20 intermediate the ends of the links 11 affords transverse compression of the links whereby the link members 11 may be simultaneously clamped in the desired position to the support 10 and to the bracket 13, 14.

It can easily be seen from the drawing that the protecting shield 17 is adapted not only for swinging around the pin 19, but also for a similar motion around the pin 12. Such a mounting permits the shield to be swung back from the tool, i. e. towards the left in Fig. 1, to provide access to the tool, leaving only a very narrow gap between the shield 17 and the cover 18 when the parts are in their normal operative position. When the screw 9 is loosened, the whole support assembly of the shield 17 with the links 11 and support 10 may be rotated around the pivot 8, or may be moved to another part of the machine which need only be provided with a pivot as at 8.

While I have described and illustrated one embodiment of my invention, I do not wish to unnecessarily limit the scope of this invention, but reserve the right to make such modifications and rearrangements of the several parts as may come within the purview of the accompanying claims.

What I claim is:

1. A guard for a machine tool having a horizontal shaft and a bearing post therefor, said guard comprising a bracket member, a support member, a shield rigidly connected with said bracket member, link means vertically swingably connected with and straddling said support member and said bracket member, transverse compressing means intermediate the ends of said link means whereby the link means may be compressed to clamp said link means in the desired position relatively to said support member as well as to said bracket member, and a vertical pivot extending from the bearing post of the machine tool, said support member being horizontally rotatably and removably supported by said pivot.

2. A guard for a machine tool as defined in claim 1, said shield having a substantially semicircular frusto-conical configuration.

ANDRÉ BECHLER.

References Cited in the file of this patent

UNITED STATES PATENTS

| Number | Name | Date |
|---|---|---|
| 79,766 | Lamphere | July 7, 1868 |
| 189,235 | Knowlton | Apr. 3, 1877 |
| 910,655 | Fells | Jan. 26, 1909 |
| 1,447,996 | Muehlhauser | Mar. 13, 1923 |
| 1,741,044 | Whipple et al. | Dec. 24, 1929 |
| 2,165,142 | Jeffreys | July 4, 1939 |
| 2,173,772 | Timmons | Sept. 19, 1939 |
| 2,410,503 | Johnson | Nov. 5, 1946 |
| 2,413,266 | Tinsler et al. | Dec. 24, 1946 |
| 2,440,873 | Popp et al. | May 4, 1948 |
| 2,469,531 | Toth et al. | May 10, 1949 |

FOREIGN PATENTS

| Number | Country | Date |
|---|---|---|
| 179,412 | Great Britain | May 4, 1922 |
| 571,116 | Great Britain | Aug. 8, 1945 |